July 6, 1926.
C. E. KACHE
1,591,837
STOCK FEEDER
Filed Nov. 10, 1922    2 Sheets-Sheet 1
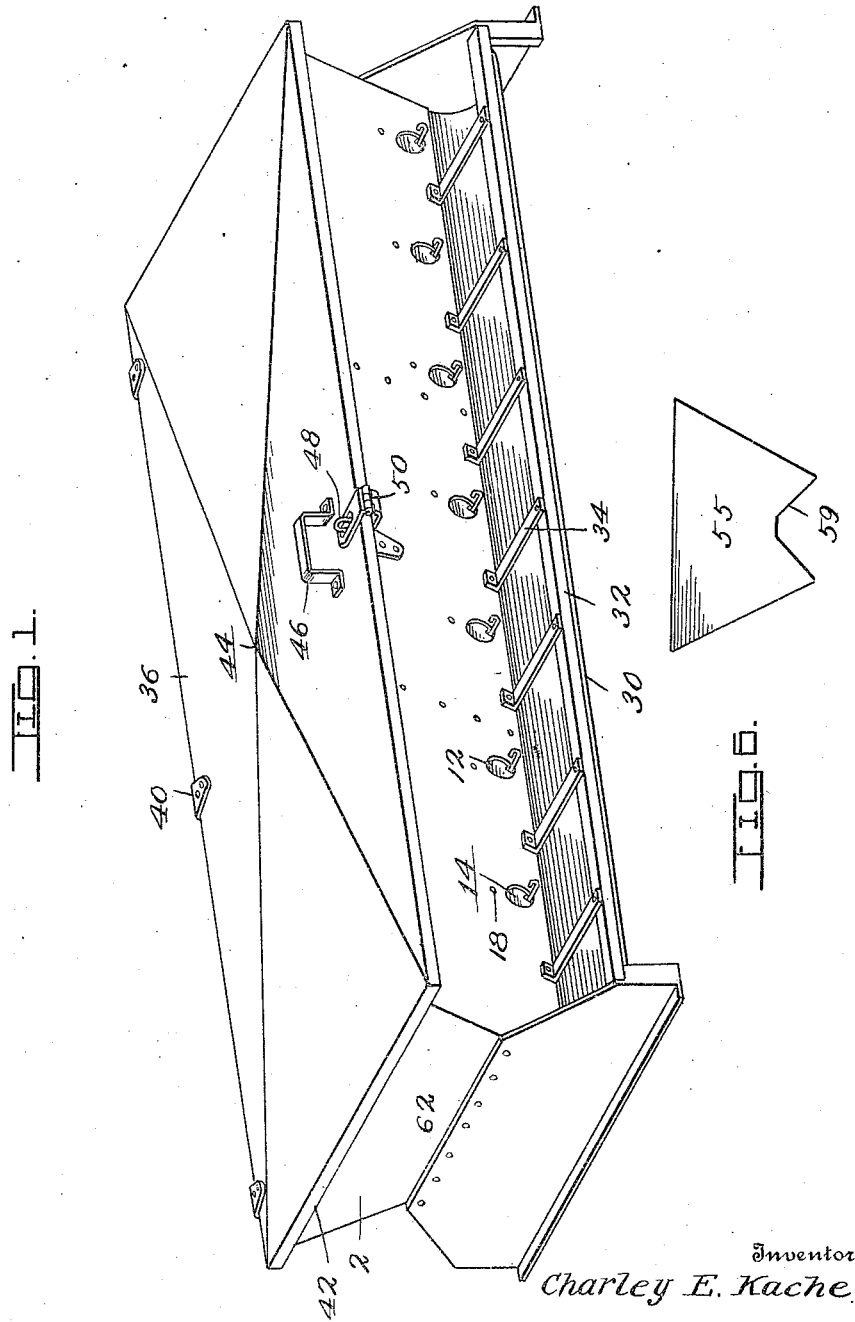
Inventor:
Charley E. Kache,
By F. G. Fischer,
Attorney.
Witness:
Fred C. Fischer.

July 6, 1926.
C. E. KACHE
1,591,837
STOCK FEEDER
Filed Nov. 10, 1922    2 Sheets-Sheet 2
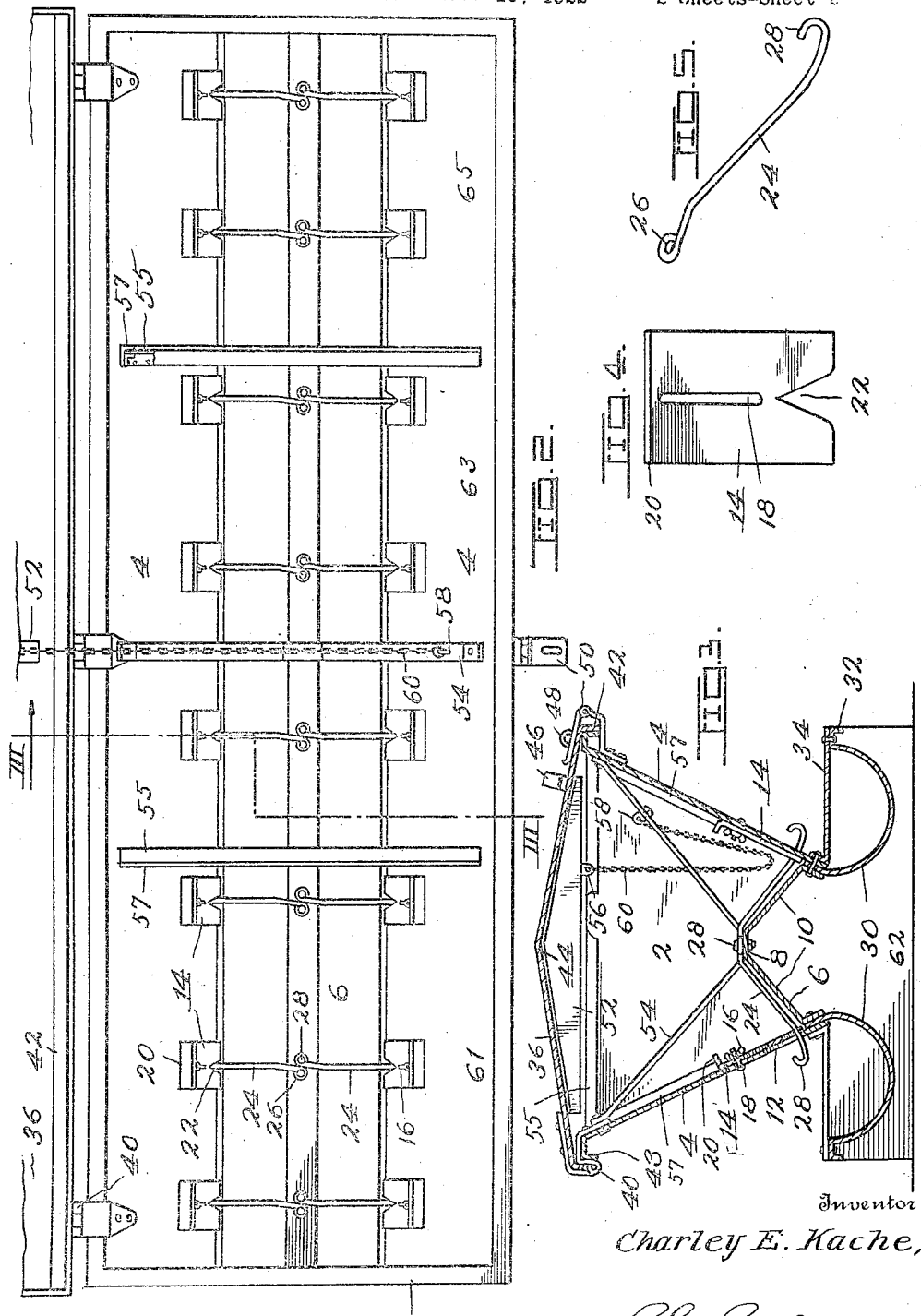
Inventor:
Charley E. Kache,
By F. G. Fischer,
Attorney.
Witness:

Patented July 6, 1926.

1,591,837

UNITED STATES PATENT OFFICE.

CHARLEY E. KACHE, OF EXCELSIOR SPRINGS, MISSOURI, ASSIGNOR OF ONE-HALF TO NELLIE E. CRAGO, OF KANSAS CITY, MISSOURI.

STOCK FEEDER.

Application filed November 10, 1922. Serial No. 600,050.

My invention relates to stock feeders, and one object is to provide a new and useful structure of this character from which the feed may be readily partaken of by hogs and other animals and which is so constructed and arranged as to prevent the feed therein from being injured by the elements, as the structure excludes sunlight, winds and rain and is also rodent-proof.

A further object is to provide a stock feeder with a bin for holding the feed and troughs to which the feed flows from the bin by the force of gravity, agitators being supplied for actuation by the animals to prevent the feed from clogging at the outlets in the lower portion of the bin.

A further object is to provide novel means for regulating and controlling the flow of feed from the bins to the feed troughs.

Other objects will hereinafter appear, and in order that the invention may be fully understood, reference will now be had to the accompanying drawings, in which:—

Fig. 1 is a perspective view of the stock feeder.

Fig. 2 is a plan view of the stock feeder with its lid in open position and partly broken away.

Fig. 3 is an irregular vertical cross section on line III—III of Fig. 2, with the lid in closed position.

Fig. 4 is a detail elevation of one of a plurality of valves for controlling the flow of feed from the bin to the feed troughs.

Fig. 5 is a detail perspective view of one of the agitators.

Fig. 6 is a detail side elevation of a partition.

In carrying out the invention, I employ a bin 2, the longitudinal sides 4 of which converge towards their lower margins and are secured to the longitudinal margins of the bin bottom 6. The bin bottom 6 consists of a raised central portion 8 with downwardly-diverging longitudinal sides 10, which direct the feed to outlets 12 in the lower portion of the bin sides 4.

14 designates valves for regulating the flow of the feed through the outlets 12. Said valves 14 are slidably mounted against the inner surface of the bin sides 4 and are held in position by thumb nuts 16 and bolts 18, which latter pass through complemental holes in the bin sides 4 and longitudinal slots 18 in the valves 14. By loosening the thumb nuts 16 the valves 18 may be adjusted upwardly or downwardly to cover or uncover the outlets 12 as desired, the upper margins of each valve 14 being bent at right angles to the body of the valve to form a finger hold 20.

Each valve 14 has a V-shaped notch 22 in its lower portion to permit an agitator 24 to project therethrough, one of said agitators 24 being associated with each valve 14. Each agitator 24 is provided at its upper end with an eye 26 to receive a pivot 28 which extends through the raised portion 8 of the bin bottom 6, while the lower end of each agitator 24 is bent as indicated at 28 to present a relatively broad surface to the nose of a hog or other animal desiring to actuate the agitator for the purpose of causing the feed to flow freely through the associate outlet 12.

The feed flows through the openings 12 into a pair of troughs 30 arranged at opposite sides of and extending longitudinally of the lower portion of the bin 2. The outer margins of the troughs 30 are reinforced with longitudinal flanges 32, which are held in proper relation to the lower portion of the bin sides 4 by spacing stays 34 secured to the top of the troughs 30 and the lower portions of said bin sides 4.

The upper portion of the bin 2 is provided with a lid 36 secured to the upper portion of one of the bin sides 4 by hinges 40. The margin of the lid 36 is reinforced by a depending flange 42, which extends entirely around said lid 36 and overlaps the sides and ends of the bin 2 to form a joint which is rain-tight and rodent-proof.

The lid 36 is reinforced by a marginal flange 43 and raised at its central portion 44 from which it slopes in four directions in order to readily shed rain. The forward portion of the lid 36 is equipped with a handle 46 and a staple 48, which latter is adapted to receive the slotted portion of a hasp 50 secured to the front side of the bin 2. The lid 36 is reinforced by a centrally-disposed transverse brace 52 while the longitudinal bin sides 4 are reinforced by a centrally-disposed brace 54 secured to the upper portion of the bottom 6 and the upper portions of the bin sides 4, as more clearly shown by Fig. 3.

The braces 52 and 54 are provided with eyes 56 and 58, respectively, to which the ends of a chain 60 are attached to support the lid 36 in open position. In addition to the brace 54, the bin sides 4 are reinforced with partitions 55 removably-arranged in slideways 57, secured to said bin sides 4. The partitions 55 are cut, substantially, in inverted V-form at their lower portions 59 to snugly fit the bottom 6, so that different feeds placed in the different compartments 61, 63, and 65 formed by the partitions 55, cannot become intermixed.

The ends 62 of the bin 2 extend downwardly below the sides 4 and the troughs 30 to support the latter above the ground.

In practice the valves 14 are adjusted to uncover the outlets 12 to the desired extent, after which said valves 14 are firmly secured at their adjusted positions by tightening the thumb nuts 16. The bin 2 is then supplied with feed, or feeds, which is caused to flow into the troughs 30 when the agitators 24 are actuated by the animals pushing against the same with their noses. Only dry feed is placed in the bin 2, so that it will flow freely through the outlets 12 when the agitators 24 are actuated. When milk or other liquid feeds are to be fed they are poured directly into the troughs 30, the upper margins of which are arranged on a lower level than the outlets 12, so that the liquid feed cannot flow into the bin 2 and cause the dry feed therein to pack or clog so that it cannot flow through the outlets 12.

The feeder is preferably constructed entirely of galvanized sheet metal, although I do not restrict myself to this material as wood or other materials may be employed to advantage.

While I have shown the preferred construction, combination and arrangement of parts, I reserve the right to make such changes as properly fall within the spirit and scope of the claim.

Having thus described my invention, what I claim and desire to secure by Letters Patent, is:—

A stock feeder consisting of two ends, two longitudinal sides fixed to said ends and sloping inwardly at their lower portions which are provided with a plurality of outlets, exterior troughs extending longitudinally of said sides and below said outlets, a bottom projecting upwardly between said longitudinal sides and secured to the lower margins thereof on a level with the bottoms of the outlets, slide valves adjustably mounted on the longitudinal sides to control the flow of feed to said troughs, and agitators pivoted to the upper central portion of said bottom and projecting through the outlets.

In testimony whereof I affix my signature.

CHARLEY E. KACHE.